United States Patent
van Rietschote et al.

(10) Patent No.: US 7,246,200 B1
(45) Date of Patent: Jul. 17, 2007

(54) PROVISIONING AND SNAPSHOTTING USING COPY ON READ/WRITE AND TRANSIENT VIRTUAL MACHINE TECHNOLOGY

(75) Inventors: Hans F. van Rietschote, Sunnyvale, CA (US); Mahesh P. Saptarshi, Mountain View, CA (US); Craig W. Hobbs, Mountain View, CA (US)

(73) Assignee: VERITAS Operating Corporation, Mountain View, CA (US)

( * ) Notice: Subject to any disclaimer, the term of this patent is extended or adjusted under 35 U.S.C. 154(b) by 419 days.

(21) Appl. No.: 10/706,742

(22) Filed: Nov. 12, 2003

(51) Int. Cl.
*G06F 12/00* (2006.01)
(52) U.S. Cl. ...................... 711/114; 709/220
(58) Field of Classification Search ............... 711/114
See application file for complete search history.

(56) References Cited

U.S. PATENT DOCUMENTS

| | | |
|---|---|---|
| 4,912,628 A | 3/1990 | Briggs |
| 4,969,092 A | 11/1990 | Shorter |
| 5,257,386 A | 10/1993 | Saito |
| 5,408,617 A | 4/1995 | Yoshida |
| 5,546,558 A | 8/1996 | Jacobson et al. |
| 5,621,912 A | 4/1997 | Borruso et al. |
| 5,809,285 A | 9/1998 | Hilland |
| 5,852,724 A | 12/1998 | Glenn, II et al. |
| 5,872,931 A | 2/1999 | Chivaluri |
| 5,944,782 A | 8/1999 | Noble et al. |
| 5,987,565 A | 11/1999 | Gavaskar |
| 6,003,065 A | 12/1999 | Yan et al. |
| 6,029,166 A | 2/2000 | Mutalik et al. |
| 6,075,938 A | 6/2000 | Bugnion et al. |
| 6,151,618 A | 11/2000 | Wahbe et al. |
| 6,230,246 B1 | 5/2001 | Lee et al. |
| 6,298,390 B1 | 10/2001 | Matena et al. |
| 6,298,428 B1 | 10/2001 | Munroe et al. |
| 6,324,627 B1 | 11/2001 | Kricheff et al. |
| 6,341,329 B1 | 1/2002 | LeCrone et al. |

(Continued)

OTHER PUBLICATIONS

VERITAS Software Corporation, "Comprehensive Application Performance Management with Veritas i³™," 2003, 3 pages.

(Continued)

*Primary Examiner*—Brian R. Peugh
*Assistant Examiner*—Hahem Farrokh
(74) *Attorney, Agent, or Firm*—Lawrence J. Merkel; Meyertons, Hood, Kivlin, Kowert & Goetzel, P.c.

(57) ABSTRACT

In one embodiment, a computer accessible medium comprises instructions which, when executed, check a first storage from which a computer system is configured to boot for a block identified in a read request. The block is included within an image of a set of software resources to be provisioned on the computer system. If the block is stored in the first storage, the instructions supply the block from the first storage in response to the read request. Otherwise, the instructions: fetch the block from an image repository system that stores the image; store the block in the first storage; and supply the block in response to the read request. In another embodiment, the instructions store a block identified in a write request to the first storage. The instructions record that the block is modified in the first storage with respect to the image stored in an image repository system.

29 Claims, 10 Drawing Sheets

U.S. PATENT DOCUMENTS

| | | | |
|---|---|---|---|
| 6,363,462 | B1 | 3/2002 | Bergsten |
| 6,370,614 | B1 | 4/2002 | Teoman et al. |
| 6,370,646 | B1 | 4/2002 | Goodman et al. |
| 6,397,242 | B1 | 5/2002 | Devine et al. |
| 6,421,739 | B1 | 7/2002 | Holida |
| 6,421,777 | B1 * | 7/2002 | Pierre-Louis et al. .......... 713/2 |
| 6,438,642 | B1 | 8/2002 | Shaath |
| 6,493,811 | B1 | 12/2002 | Blades et al. |
| 6,496,847 | B1 | 12/2002 | Bugnion et al. |
| 6,694,346 | B1 | 2/2004 | Aman et al. |
| 6,704,925 | B1 | 3/2004 | Bugnion |
| 6,711,672 | B1 | 3/2004 | Agesen |
| 6,718,538 | B1 | 4/2004 | Mathiske |
| 6,725,289 | B1 | 4/2004 | Waldspurger et al. |
| 6,735,601 | B1 | 5/2004 | Subrahmanyam |
| 6,754,781 | B2 * | 6/2004 | Chauvel et al. ............. 711/143 |
| 6,757,778 | B1 | 6/2004 | van Rietschote |
| 6,763,440 | B1 | 7/2004 | Traversat et al. |
| 6,763,445 | B1 | 7/2004 | Klein et al. |
| 6,772,231 | B2 | 8/2004 | Reuter et al. |
| 6,785,886 | B1 | 8/2004 | Lim et al. |
| 6,789,103 | B1 | 9/2004 | Kim et al. |
| 6,789,156 | B1 | 9/2004 | Waldspurger |
| 6,795,966 | B1 | 9/2004 | Lim et al. |
| 6,799,316 | B1 * | 9/2004 | Aguilar et al. .................. 718/1 |
| 6,854,115 | B1 * | 2/2005 | Traversat et al. .............. 718/1 |
| 6,961,806 | B1 | 11/2005 | Agesen et al. |
| 6,961,941 | B1 | 11/2005 | Nelson et al. |
| 6,985,956 | B2 | 1/2006 | Luke et al. |
| 7,069,413 | B1 | 6/2006 | Agesen et al. |
| 7,082,598 | B1 | 7/2006 | Le et al. |
| 7,089,377 | B1 | 8/2006 | Chen |
| 7,111,086 | B1 | 9/2006 | Ecoleston et al. |
| 7,111,145 | B1 | 9/2006 | Chen et al. |
| 7,111,481 | B2 | 9/2006 | Green et al. |
| 2001/0016879 | A1 | 8/2001 | Seklguchi et al. |
| 2002/0049869 | A1 | 4/2002 | Ohmura et al. |
| 2002/0069369 | A1 | 6/2002 | Tremain |
| 2002/0099753 | A1 | 7/2002 | Hardin et al. |
| 2002/0129078 | A1 | 9/2002 | Plaxton et al. |
| 2003/0028861 | A1 | 2/2003 | Wallman et al. |
| 2003/0033431 | A1 | 2/2003 | Shinomiya |
| 2003/0097422 | A1 * | 5/2003 | Richards et al. ............ 709/217 |
| 2003/0110351 | A1 | 6/2003 | Blood et al. |
| 2003/0126242 | A1 * | 7/2003 | Chang ........................ 709/222 |
| 2003/0142561 | A1 * | 7/2003 | Mason et al. ............... 365/200 |
| 2004/0010787 | A1 | 1/2004 | Traut et al. |
| 2004/0268340 | A1 * | 12/2004 | Steeb et al. .................. 717/174 |
| 2005/0071549 | A1 * | 3/2005 | Tross et al. ................. 711/113 |

OTHER PUBLICATIONS

VERITAS Software Corporation,"VERITAS Enterprise Server Automation," 2003, 8 pages.
VERITAS Software Corporation, "Server Consolidation with VERITAS OpForce; Optimizing your Infrastructure Availability and Utlizations," 2003, 6 pages.
VERITAS Software Corporation, "Server Automation with VERITAS OpForce; Enterprise Operations Automation-Enhancing Workflows, Administration, and Management," 2003, 6 pages.
VERITAS Software Corporation, "Rapid Server Deployment with VERITAS OpForce; The Enterprise-Scale, Server Deployment Solution for Heterogeneous Environments," 2003, 6 pages.
VERITAS Software Corporation, "High Availability Clustering in a Microsoft Windows Environment; VERITAS Cluster Server for Microsoft Windows NT" 2000, 20 pages.
VERITAS Software Corporation, "VERITAS Cluster Server v2.0; Technical Overview," 2001, 12 pages.
VERITAS Software Corporation, "Managing Application Availability with Application Clustering and the VERITAS Cluster Server Version 2.0," 2002, 32 pages.
Sapuntzakis, et al., "Optimizing the Migration of Virtual Computers," Proceedings of the Fifth Symposium on Operating Systems Design and Implementation, Dec. 2002, 14 pages.
Helfrich, et al., "Internet Suspend/Resume," ISR Project Home Page, 2003, 4 pages.
Kozuch, et al., "Internet Suspend/Resume," IRP-TR-02-01, Apr. 2002, Accepted to the Fourth IEEE Workshop on Mobile Computing Systems and Applications, Callicoon, NY, Jun. 2002, Intel Research, 9 pages.
Kozuch, et al., "Efficient State Transfer for Internet Suspend/Resume," IRP-TR-02-03, May 2002, Intel Research, 13 pages.
Tolia, et al., "Using Content Addressing to Transfer Virtual Machine State," IRP-TR-02-11, Summer 2002, Intel Research, 11 pages.
Flinn, et al., "Data Staging on Untrusted Surrogates," IRP-TR-03-03, Mar. 2003, Intel Research, To Appear in the Proceedings of the $2^{nd}$ USENIX Conference on File and Storage Technologies, San Francisco, 16 pages.
Tolia, et al., "Opportunistic Use of Content Addressable Storage for Distributed File Systems," IRP-TR-03-02, Jun. 2003, Intel Research, To Appear in the Proceedings of the 2003 USENIX Annual Technical Conference, San Antonio, TX, 16 pages.
VMware, Inc., "VMware Control Center," 2003, 3 pages.
InfoWorld, Robert McMillan, "VMware Launches VMware Control Center," 2003, 2 pages.
VMware, Inc., "VMware Control Center: Enterprise-class Software to Manage and Control Your Virtual Machines," 2003, 2 pages.
John Abbott, Enterprising Software, "VMware Heads Toward Utility Computing With New Dynamic Management Tools," Jul. 1, 2003, 4 pages.
Dejan S. Milogicic, et al., "Process Migration," Aug. 10, 1999, 49 pages.
Xian-He Sun, et al., "A Coordinated Approach for Process Migration in Heterogeneous Environments," 1999, 12 pages.
Kasidit Chanchio, et al., "Data Collection and Restoration for Heterogeneous Process Migration," 1997, 6 pages.
Kasidit Chanchio, et al., "A Protocol Design of Communication State Transfer for Distributed Computing," Publication date unknown, 4 pages.
SourceForge™, "Project: openMosix: Document Manager: Display Document," 14 pages.
OpenMosix, "The openMosix HOWTO: Live free() or die ()," May 7, 2003, 3 pages.
OpenMosix, "openMosix Documentation Wiki—don't," May 7, 2003, 2 pages.
Veritas, "Executive Overview," Technical Overview, pp. 1-9.
Kinshuk Govil, et al., "Cellular Disco: Resource Management Using Virtual Clusters on Shared-Memory Multiprocessors," $17^{th}$ ACM Symposium on Operating Systems Principles (SOSP'99), Published as Operating Systems Review 34(5):154-169, Dec. 1999, pp. 154-169.
Edouard Bugnion, et al., "Disco: Running Commodity Operating Systems on Scalable Multiprocessors," Computer Systems Laboatoy, Stanford, CA, 33 pages.
"White Paper, GSX Server," VMware, Inc., Dec. 2000, pp. 1-9.
"Vmware GSX Serve, The Server Consolidation Solution," VMware, Inc., 2001, 2 pages.
"Manage Multiple Worlds., From Any Desktop," VMware, Inc., 2000, 2 pages.
"VMware ESX Server, The Server Consolidation Solution for High-Performance Environments," VMware, Inc., 2001, 2 pages.
Melinda Varian, "VM and the VM Community: Past, Present, and Future," Operating Systems, Computing and Information Technology, Princeton Univ., Aug. 1997, pp. 1-67.
VERITAS, "Comparison: Microsoft Logical Disk Manager and VERITAS Volume Manager for Windows," May 2001, 4 pages.
VERITAS, "How VERITAS Volume Manager Complements Hardware RAID in Microsoft Server Environments," May 2001, pp. 1-7.
VERITAS, "VERITAS Volume Manager for Windows, Best Practices," May 2001, pp. 1-7.
Barrie Sosinky, Ph.D., "The Business Value of Virtual Volume Management, In Microsoft Window NT and Windows 2000 Netowrks," VERITAS, A white paper for administrators and planners, Oct. 2001, pp. 1-12.

VERITAS, "VERITAS Volume Manager for Windows NT," Version 27, 2001, 4 pages.
"BladeFram™ System Overview," Egenera, Inc., 2001 2 pages.
White Paper, "The Egenera™ Processing Area Network (PAN) Architecture," Egenera, Inc., 2002, 20 pages.
White Paper, "Emerging Server Architectures,"Egenera, Inc., 2001, 12 pages.
White Paper, "Improving Data Center Performance," Egenera, Inc., 2001, 19 pages.
White Paper, "Guidelines for Effective E-Business Infrastructure Management," Egenera, Inc., 2001, 11 pages.
White Paper, "The Pros and Cons of Server Clustering in the ASP Environment," Egenera, Inc., 2001, 10 pages.
Position Paper, "Taking Control of The Data Center," Egenera, Inc., 2001, 4 pages.
Position Paper, "The Linux Operating System: How Open Source Software Makes Better Hardware," Egenera, Inc., 2001, 2 pages.
"Solution Overview," TrueSAN Networks, Inc., 2002, 7 pages.
"Simics: A Full System Simulation Platform," Reprinted with permission from Computer, Feb. 2002, © The Institute of Electrical and Electronics Engineering, Inc., pp. 50-58.
"Introduction to Simics Full-System Simulator without Equal," Virtutech, Jul. 8, 2002, 29 pages.
"The Technology of Virtual Machines," A Conneectix White Paper, Connectix Corp., 2001, 13 pages.
"The Technology of Virtual PC," A Conneectix White Paper, Connectix Corp., 2000, 12 pages.
"About LindowsOS," Lindows.com, http://www.lindows.com/lindows_products_lindowsos.php, 2002, 2 pages.
"Savannah: This is a Savannah Admin Documentation," Savannah, Free Software Foundation, Inc. © 2000-2002, 31 pages.
"Virtuozzo Basics," Virtuozzo, http://www.sw-soft.com/en/products/virtuozzo/basics/, © 1994-2002 SWsoft, printed from web on Dec. 13, 2002, 2 pages.
"What is Virtual Environment(VE)?," SWsoft, http://www.sw-soft/en/products/virtuozzo/we/, © 1994-2002 SWsoft, printed from web on Dec. 13, 2002, 2 pages.
"Products," Netraverse, Inc, 2002, http://www.netraverse.com/products/index.php, printed from web on Dec. 13, 2002, 1 page.
"NeTraverse Win4Lin 4.0—Workstation Edition," Netraverse, Inc, 2002, http://www.netraverse.com/products/win4lin40/, printed from web on Dec. 13, 2002, 1 page.
"Win4Lin Desktop 4.0," Netraverse, Inc, 2002, http://www.netraverse.com/products/win4lin40/benefits.php, printed from web on Dec. 13, 2002, 1 page.
"Win4Lin Desktop 4.0," Netraverse, Inc, 2002, http://www.netraverse.com/ products/win4lin40/features.php, printed from web on Dec. 13, 2002, 2 pages.
"Win4Lin Desktop 4.0," Netraverse, Inc, 2002, http://www.netraverse.com/products/win4lin40/requirements.php, printed from web on Dec. 13, 2002, 2 page.
"Win4Lin Terminal Server 2.0," Netraverse, Inc, 2002, http://www.netraverse.com/ products/wts, printed from web on Dec. 13, 2002, 1 page.
"Win4Lin Terminal Server 2.0," Netraverse, Inc, 2002, http://www.netraverse.com/ products/wts benefits.php, printed from web on Dec. 13, 2002, 1 page.
Win4Lin Terminal Server 2.0, Netraverse, Inc, 2002, http://www.netraverse.com/ products/wts/features.php, printed from web on Dec. 13, 2002, 2 pages.
Win4Lin Terminal Server 2.0, Netraverse, Inc, 2002, http:// www.netraverse.com/products/wts/requirements.php, printed from web on Dec. 13, 2002, 2 pages.
Win4Lin Terminal Server 2.0, Netraverse, Inc, 2002, http://www.netraverse.com/products/wts/technology.php, printed from web on Dec. 13, 2002, 1 page.
Win4Lin, Netraverse, Inc, 2002, http://www.netraverse.com/ support/docs/Win4Lin-whitepapers.php, printed from web on Dec. 13, 2002, 5 pages.
"Virtual PC for Windows," Connectix, Version 5.0, 2002, 2 pages.
Dave Gardner, et al., "WINE FAQ,", © David Gardner 1995-1998, printed from www.winehq.org, 13 pages.
"Winelib User's Guide," Winelib, www.winehq.org, 26 pages.
John R. Sheets, et al. "Wine User Guide," www.winehq.org, pp. 1-53.
"Wine Developer's Guide," pages, www.winehq.org, 1-104.
VERITAS, "VERITAS Volume Replicator™ White Paper, A Guide to Understanding VERITAS Volume Replicator," White Paper, 2002, 15 pages.
Hitz, et al., "File System Design for an NFS File Server Appliance," Technical Report 2002, Rev. C 3/95, NetworkAppliance, 23 pages.
VERITAS, "VERITAS Storage Replicator, Real-time Replication for Business Critical Windows NT and Windows 2000 Environments," 7 pages.
Jacob Gorm Hansen and Asger Kahl Henriksen, Nomadic Operating Systems', Dec. 10, 2002, 42 pages.
Kinshuk Govil, "Virtual Clusters" Resources Management on Large Shared-Memory Multiprocessors, Oct. 2000, 133 pages.
Constantine P. Sapuntzakis, et al., "Optimizing the Migration of Virtual Computer," Feb. 12, 2003, 26 pages.
Edouard Bugnion, et al., "Running Commodity Operating Systems on Scalable Multiprocessors," 1997, 13 pages.

* cited by examiner

PROVISIONING AND SNAPSHOTTING USING COPY ON READ/WRITE AND TRANSIENT VIRTUAL MACHINE TECHNOLOGY

BACKGROUND OF THE INVENTION

1. Field of the Invention

This invention is related to the field of provisioning computer systems to execute a set of software resources.

2. Description of the Related Art

Software provisioning of computer systems is becoming more pervasive as businesses attempt to more fully utilize the computer power they have at their disposal. As the workload being performed by a set of computer systems changes, it may be desirable to shift workload of various types from one computer system to another, to increase or decrease the number of computer systems handling a given type of workload, etc. Different workloads may require different software resources (e.g. operating systems, applications, etc.), and thus the configuration of the computer systems may need to be changed. Providing a computer system with a set of software resources is referred to as provisioning the computer system.

Software provisioning generally involves copying an image of the software resources from an image repository system to the target computer system, typically across a network of some sort. Provisioning a computer system frequently takes a relatively long period of time (e.g. 20 minutes or more, depending on the size of the image, the speed of the network, etc.). The amount of time required to provision a computer system may impact how efficiently computer systems can be redeployed to handle other workloads. For example, the OpForce™ product currently available from VERITAS Software Corporation (Mountain View, Calif.) may do the following to provision a computer system (OpForce executes on the image repository system): The target computer system sends out a Pre Execution Environment (PXE) boot request (during boot of the target computer system). OpForce receives the PXE boot request, and transmits a lightweight Linux operating system (the "Active OS") to the target computer system. The target computer system boots into the Active OS, which mounts the image repository system containing the image to be provisioned (e.g. a network file system (NFS) or common internet file system (CIFS) mount). The Active OS executes a make filesystem command on the target computer system, and copies all files from the image on the image repository system to the local disk in the target computer system The Active OS "personalizes" the local files (hostname, IP address, etc). The Active OS then reboots the target computer system. The target computer system again sends out a PXE boot request, which OpForce ignores. The target computer system times out on the PXE boot request and boots from the local disk.

In some cases, provisioning may be accomplished by having multiple bootable images in a storage area network (SAN) or Network Attached Storage (NAS), and directing a target computer system to boot from the desired image. Small Computer Systems Interface over Internet Protocol (iSCSI) disks could be used in a similar fashion. While some high-end server systems may be capable of such booting, many computer systems (e.g. personal computer (PC) systems based on Intel or AMD processors) typically are not designed to boot in this fashion. If a large amount of local storage is included in a target computer system, multiple bootable images may be stored in the local storage, and the desired image may be selected for booting (e.g. so called "multiple bootable partitions").

Another function which may take a relatively long period of time is snapshotting a system image from a computer system into the image repository. For example, the current OpForce product may perform the following to snapshot an image into the image repository system: OpForce communicates with an OpForce agent running on the target computer system, requesting a reboot of the target computer system. The target sends out a PXE boot request during the reboot. OpForce detects the PXE boot request, and pushes the Active OS to the target computer system in response. The target computer system boots the Active OS, which mounts the image repository system. Active OS copies the changed files to the image repository system. Determining which files have changed requires communication back and forth between the target computer system and the image repository system (e.g. comparing time stamps of corresponding blocks on the target computer system and the image repository system).

During both provisioning and snapshotting, the target computer system may be unavailable to perform other work.

SUMMARY OF THE INVENTION

In one embodiment, a computer accessible medium comprises instructions which, when executed, check a first storage from which a computer system is configured to boot for a block identified in a read request generated on the computer system. The block is included within an image of a set of software resources to be provisioned on the computer system. If the block is stored in the first storage, the instructions supply the block from the first storage in response to the read request. If the block is not stored in the first storage, the instructions: fetch the block from an image repository system that stores the image; store the block in the first storage; and supply the block in response to the read request.

In another embodiment, a computer accessible medium comprises instructions which, when executed, store a block identified in a write request generated within a computer system to a first storage from which the computer system is configured to boot. The block is included in an image of a set of software resources that are provisioned on the computer system. The instructions also record that the block is modified with respect to the image stored in an image repository system.

In yet another embodiment, a method for provisioning a computer system with a set of software resources is contemplated. Execution of the set of software resources is initiated on the computer system prior to storing at least some blocks comprising the set of software resources to a first storage from which the computer system is configured to boot. The computer system generates a read request for a first block of the blocks comprising the set of software resources. If the first block is stored in the first storage, the first block is supplied from the first storage. If the first block is not stored in the first storage: the first block is fetched from an image repository system that stores an image of the set of software resources; the first block is stored in the first storage; and the first block is supplied in response to the read request.

In another embodiment, an apparatus comprises an image repository system and a computer system. The image repository system is configured to store an image of a set of software resources. The computer system is configured to transmit a remote boot request in response to booting. The image repository system is coupled to receive the remote boot request, and is configured to detect that the computer system is to be provisioned with the set of software resources. The image repository system is configured to respond to the remote boot request with a program which, when executed by the computer system, initiates execution of the set of software resources prior to at least some blocks in the image being copied to the computer system.

In still other embodiments, an apparatus comprises an image repository and a computer system. The image repository is configured to store an image of a set of software resources. The computer system is configured to execute the set of software resources, and is configured to track blocks: (i) in a first storage from which the computer system is configured to boot; and (ii) corresponding to the image which are updated with respect to the image stored on the image repository. The updates are generated by the computer system during execution of the set of software resources. A snapshot of the image as updated by the computer system is generated by transmitting the modified blocks from the computer system to the image repository system and not transmitting unmodified blocks.

BRIEF DESCRIPTION OF THE DRAWINGS

The following detailed description makes reference to the accompanying drawings, which are now briefly described.

Figure 1:
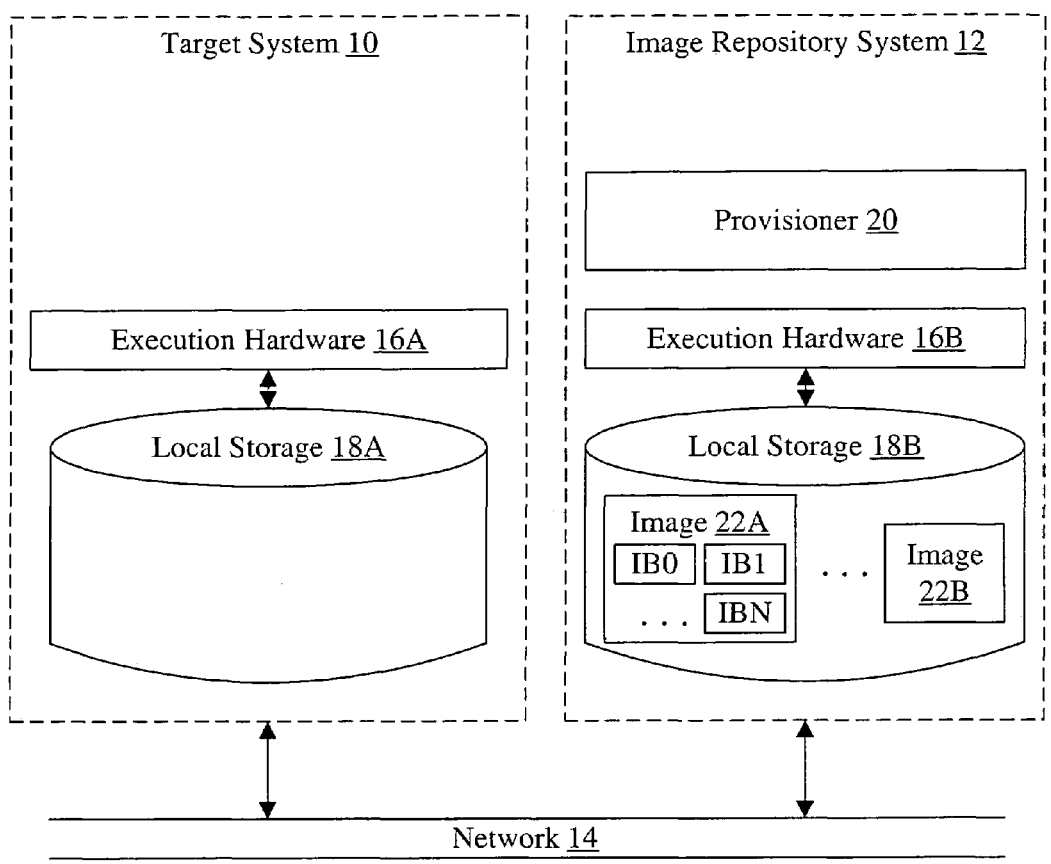
FIG. 1 is a block diagram of one embodiment of a target system and an image repository system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Turning now to FIG. 1, a block diagram is shown illustrating one embodiment of a target computer system 10 and an image repository computer system 12 coupled to a network 14. The target computer system 10 may be more succinctly referred to herein as the target system 10 or system 10, and the image repository computer system 12 may be more succinctly referred to as the image repository system 12 or system 12. While one target system 10 and one image repository system 12 are shown in FIG. 1, generally one or more target systems 10 and one or more image repository systems 12 may be included in various embodiments. Each of the systems 10 and 12 may include execution hardware (e.g. the execution hardware 16A in the system 10 and the execution hardware 16B in the system 12) and local storage coupled to the execution hardware (e.g. the local storage 18A in system 10 and the local storage 18B in system 12). The image repository system 12 may further include provisioner software 20. Additionally, the local storage 18B may store one or more images including images 22A-22B shown in FIG. 1. Each image 22A-22B may include one or more image blocks. For example, the image 22A is illustrated as containing image block 0 (IB0 in FIG. 1), image block 1 (IB1 in FIG. 1), and other image blocks up to image block N (IBN in FIG. 1).

The target system 10 may be a computer system that is to be provisioned with a set of software resources included within one of the images 22A-22B on the image repository system 12. For this discussion, the image 22A may include the software resources to be provisioned on the target system 10, although generally any image may be used. As used herein, the term "software resources" includes at least an operating system (referred to herein as the "target operating system"). Additionally, the software resources may include one or more applications to be executed on the target operating system. The software resources may, in some embodiments, further include data structures used by the target operating system and/or the applications. The software resources may, in some embodiments, also include various configuration parameters for the hardware (e.g. the IP address, hostname, etc. mentioned above as well as enabling or disabling various hardware or hardware features).

The target operating system(s) included in the various images 22A-22B on the image repository system 12 may include a device driver used to access the local storage on the target system (referred to herein as the "local storage (LS) device driver"). The LS device driver may be configured, in response to a read request for a block from the local storage generated by the target operating system and/or applications, to read the requested block from the local storage in the target system, if the block is present in the local storage. If the block is not present, the LS device driver may fetch the requested block from the image repository system 12. Accordingly, the provisioning software 20, when provisioning a target system 10 with an image 22A, may not copy all of the image blocks comprising the image to the local storage 18A of the target system 10. The blocks not stored in the local storage 18A may be copied from the image 22A as requested. Viewed in another way, execution of the set of software resources may be initiated on the target system 10 prior to copying at least some of the blocks comprising the image 22A to the target system 10. Accordingly, the time to copy blocks from the image repository system 12 to the target system 10 may not occur during provisioning, and thus provisioning may be completed relatively rapidly. In some cases, one or more blocks in the image 22A-22B may be infrequently accessed, and thus the software resources in the image 22A-22B may execute on the target system 10 for sometime before accessing the infrequently accessed blocks. If a block is not accessed at all, that block may not be transmitted from the image repository system 12 to the target system 10. Furthermore, some blocks may be written before they are read. Such blocks may not be transferred from the image repository system 12 to the target system 10.

While the LS device driver in the target operating system may cause the blocks to be copied in response to attempts to read the blocks, there is a time period in this embodiment, during boot and prior to the initialization of the LS device driver, in which accesses to the local storage may occur. The device driver may be "initialized" if it has been loaded into memory in the target system 10 and is ready to execute to handle accesses to the local storage 18A. For example, before the target operating system is itself initialized, firmware on the target system 10 may be executing to initialize various hardware in the system 10. The firmware may access the local storage 18A prior to the LS device driver being initialized. Generally, firmware may comprise software that is provided with the corresponding computer system, generally stored in non-volatile memory such as read-only memory (ROM), flash memory, battery-backed random access memory (RAM), etc. For example, in PC system, the basic input/output system (BIOS) code may comprise firmware.

When provisioning the target system 10 with a set of software resources, a virtual machine may be established on the target system 10. The virtual machine may have the same configuration as the target system 10, and may be monitored by a virtual machine monitor provided by the provisioner software 20. The virtual machine monitor may trap accesses by the virtual machine to the local storage 18A. The LS device driver, or code similar to the LS device driver, may copy blocks that are being read and which are not in the local storage 18A to the local storage 18A. Once the target operating system (within the virtual machine) initializes the LS device driver, the virtual machine monitor may terminate and the target operating system may execute natively on the target system 10 (that is, not within a virtual machine).

In some embodiments, the state of the software resources on the target system 10 may be captured as an image on the image repository system 12. The capturing of the state of a set of software resources in an image is referred to as snapshotting. Snapshotting may be performed to create a new image of the software resources on the image repository system 12. Such an image may be created to provide a "golden" image for installation on any target system 10 that is to be provisioned with the same software resources. Alternatively, an image may be snapshot if the target system 10 is to be reprovisioned with a different set of software resources (a different image from the image repository system 12), and the current image is expected to be returned to the target system 10 later (or is expected to be activated on another target system).

In some embodiments, the LS device driver may track which blocks within the image have been written by the target system 10. When a snapshot is desired, only the blocks that have been written may be transmitted by the target system 10 to the image repository system 12. The remaining blocks may be copied from the current image on the image repository system 12 (or the current image may be updated with the blocks provided by the target system 10). The target system 10 may be able to determine which blocks are updated without communication from the image repository system 12. In other embodiments, the LS device driver may track which blocks have been updated with respect to multiple image repository systems.

In some embodiments, provisioning of a target system may be performed from more than one image repository system. For example, the image to be provisioned may be striped across two or more image repository systems for performance reasons. Alternatively, the image may be stored on each of two or more image repository systems to provide high availability of the image (e.g. if one or more of the image repository systems is down when a block is requested by the target system.

As used herein, an "image" of a set of software resources may comprise the blocks that store the set of software resources. That is, the content of the image may be the same as the content of the set of software resources on the target system after provisioning. In some embodiments, the blocks in the image may be arranged, relative to each other, in the same fashion as the blocks are arranged in the local storage 18A when installed thereon. In other embodiments, any arrangement of the blocks in the image may be used. For example, the blocks may be compressed, stored in consecutive blocks in the repository storage, etc. The image repository may map block identifiers provided by the LS device driver to corresponding blocks in the image. In one exemplary embodiment, the VENTI approach may be used in which each block is stored in a location defined by that block's unique checksum. A "block" may be the unit of storage for the local storage device. That is, the block may be the minimum amount of storage that may be read/written. For example, a block may be 4 kilobytes in size, in some embodiments, although larger or smaller blocks may be defined in other embodiments.

As used herein, a virtual machine comprises any combination of software, one or more data structures in memory, and/or one or more files stored in a local or shared storage. The virtual machine represents the software and hardware used during execution of a given application or applications. Thus, a virtual machine may include a virtual CPU, virtual I/O devices, etc. The virtual machine in which an application is executing may encompass the entire system state associated with an application. A virtual machine monitor may be implemented which monitors execution of the virtual machine, may trap various events occurring within the virtual machine, and may emulate the events. For example, in the present embodiment, the virtual machine monitor may trap access to the local storage and may use the LS device driver, or software similar to the LS device driver, to perform the access in the local storage or request the accessed block or blocks from the image repository system 12.

The provisioner software 20 may comprise instructions which, when executed, provision target systems with images from the image repository. In some embodiments, the provisioner software 20 may be similar to the OpForce™ product available from VERITAS Software Corporation.

The image repository system 12 may store various images, each image corresponding to a set of software resources that the provisioner software 20 may provision onto a target system. Generally, as used herein, an image repository system may comprise a computer system having one or more images stored in its local storage for possible provisioning onto various target systems. For example, in some embodiments, the image repository system may make the local storage 18B (or the portion thereof storing the images 22A-22B) remotely mountable according to NFS or CIFS. Any other network file system may be used in other embodiments.

The execution hardware 16A-16B may generally comprise hardware used to execute various software on the systems 10 and 12, respectively (e.g. the provisioner software 20 on the system 12). For example, the execution hardware may include one or more processors designed to execute the instructions that comprise the software. The execution hardware may further include local memory in the node (e.g. random access memory (RAM)) and circuitry for interfacing to the network 14.

The network 14 may comprise any network technology in various embodiments. The network 14 may be a local area network, metropolitan area network, wide area network, intranet network, Internet network, wireless network, or any other type of network or combinations of the above networks. The network 14 may be designed to be continuously available (although network outages may occur), or may be intermittent (e.g. a modem connection made between a computer system in a user's home and a computer system in a user's workplace). Any network media may be used. For example, the network 14 may comprise an Ethernet network. Alternatively, the network may comprise a token ring network, a SAN, etc.

As used herein, the term "local storage" of a computer system may comprise any storage that is privately accessible by the computer system. The storage may be included in the computer system, or coupled to the computer system and external to the computer system. If another computer system is to access data in the local storage, the other computer system must communicate with the computer system, which may access the data on behalf of the other computer system. Local storage may include any type of non-volatile storage, such as fixed or removable disks using magnetic or optical media (e.g. hard drives, floppy disks, compact disc-read only memory (CD-ROM), digital versatile disk ROM (DVD-ROM), CD-recordable (CD-R), CD-Rewritable (CD-RW), DVD-R, DVD-RW, non-volatile random access memory (RAM) such as flash memory, battery-backed RAM, solid state storage, etc.).

While local storage is used as an example of the storage to which the set of software resources for a target system are provisioned, other embodiments may use non-local storage. Generally, any storage from which the target system is configured to boot may be provisioned with the set of software resources, using the mechanisms described herein. For example, the storage may be local storage, SAN storage, iSCSI storage, or any combination of the above storage. While local storage will continue to be used as an example in this disclosure, it is contemplated that any storage from which the target system is configured to boot may be used in other embodiments (along with, e.g., a corresponding device driver similar to the LS device driver described herein, virtual machine technology, in some embodiments, etc.).

Figure 2:
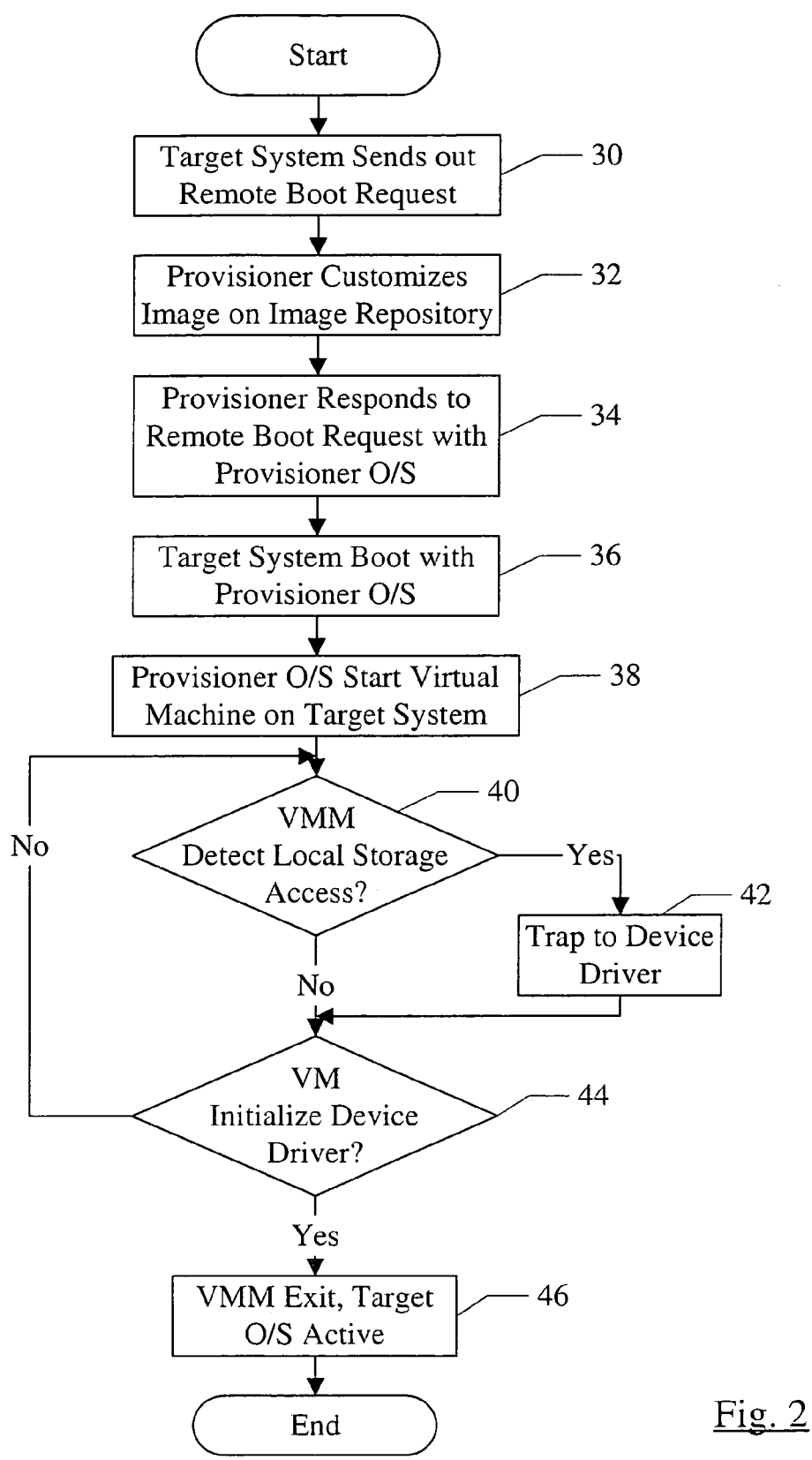
FIG. 2 is a flowchart illustrating one embodiment of a method of provisioning the target system.

Turning now to FIG. 2, a flowchart is shown illustrating one embodiment of a method for provisioning a target system (e.g. the target system 10 in FIG. 1). One or more blocks shown in FIG. 2 may be implemented in various software, as described. That is, the software may comprise instructions which, when executed, implement the functions described for the corresponding blocks.

The target system 10 may boot, and booting may include sending a remote boot request on the network 14 (reference numeral 30). For example, the firmware on the target system 10 may be configured to transmit the remote boot request. In some embodiments, the target system 10 may be a PC system and the remote boot request may comprise a PXE boot request. A PXE boot request may comprise a specially formatted packet transmitted on the network 14 that identifies the booting computer system (e.g. by the media access controller (MAC) address in the network interface controller in the booting computer system) and indicates that a boot is occurring. The booting computer system may timeout after a specified interval and booting may continue with other bootable devices (e.g. fixed or removable disk drives in the booting computer system or coupled thereto). In other embodiments, other types of remote boot protocols may be used. For example, computer systems available from Sun Microsystems, Inc. (Santa Clara, Calif.) may support a net boot protocol. As used herein, a "remote boot request" may comprise any communication from a booting computer system, transmitted external to the computer system in order to receive boot code from a remote system or device. A response to the remote boot request may include the boot code, or may indicate where the boot code may be located (within the booting computer system or external to the booting computer system).

The provisioner software 20 on the image repository system 12 may detect the remote boot request, and may determine that the target system 10 is to be provisioned with one of the images 22A-22B. Optionally, the provisioner software 20 may customize the image in the image repository (reference numeral 32). Customizations may include inserting the hostname of the target system 10, the IP address of the target system 10, the system ID of the target system 10, the cluster ID of the target system 10, any other host-specific values, etc. into the image. The provisioner software 20 responds to the remote boot request by transmitting a provisioner operating system (O/S) to the target system 10 (reference numeral 34). For example, the OpForce™ product includes an Active O/S as the provisioner O/S. The Active O/S may be a memory-resident operating system derived from the Linux code base. However, other embodiments may use other operating systems. In some embodiments, the provisioner O/S may be completely memory-resident on the target system 10. That is, the provisioner O/S may not require storage on the local storage 18A, and may execute out of the computer system's memory. The provisioner O/S may include the virtual machine monitor mentioned above, as well as a virtual machine with virtual hardware that matches the target system 10. Additionally, the provisioner O/S may include the LS device driver mentioned above, or code similar in operation thereto.

The target system 10 receives the provisioner O/S and boots with the provisioner O/S (reference numeral 36). The provisioner O/S starts the virtual machine on the target system 10 (reference numeral 38). The virtual machine monitor (VMM) included in the provisioner O/S begins monitoring for accesses to the local storage 18A. Other events may be monitored as well, if desired, in various embodiments. If the VMM detects a local storage access (decision block 40—"yes" leg), the VMM may trap to the LS device driver in the provisioner O/S to perform the access (reference numeral 42). If the virtual machine has not yet initialized the LS device driver within the operating system that is included in the image (decision block 44—"no" leg), the VMM continues monitoring for local storage 18A accesses. Once the virtual machine has initialized the LS device driver (decision block 44—"yes" leg), the VMM may exit and the target operating system may be active as the native operating system on the target computer system 10 (reference numeral 46). Even if the target system 10 is subsequently rebooted, the virtual machine may not be required to be established again since the blocks of the local storage 18A that are accessed prior to initializing the LS device driver have been copied to the local storage 18A and may be accessed locally. In other embodiments, firmware on the target system 10 may be configured to perform the functions assigned to the provisioner O/S.

Figure 3:
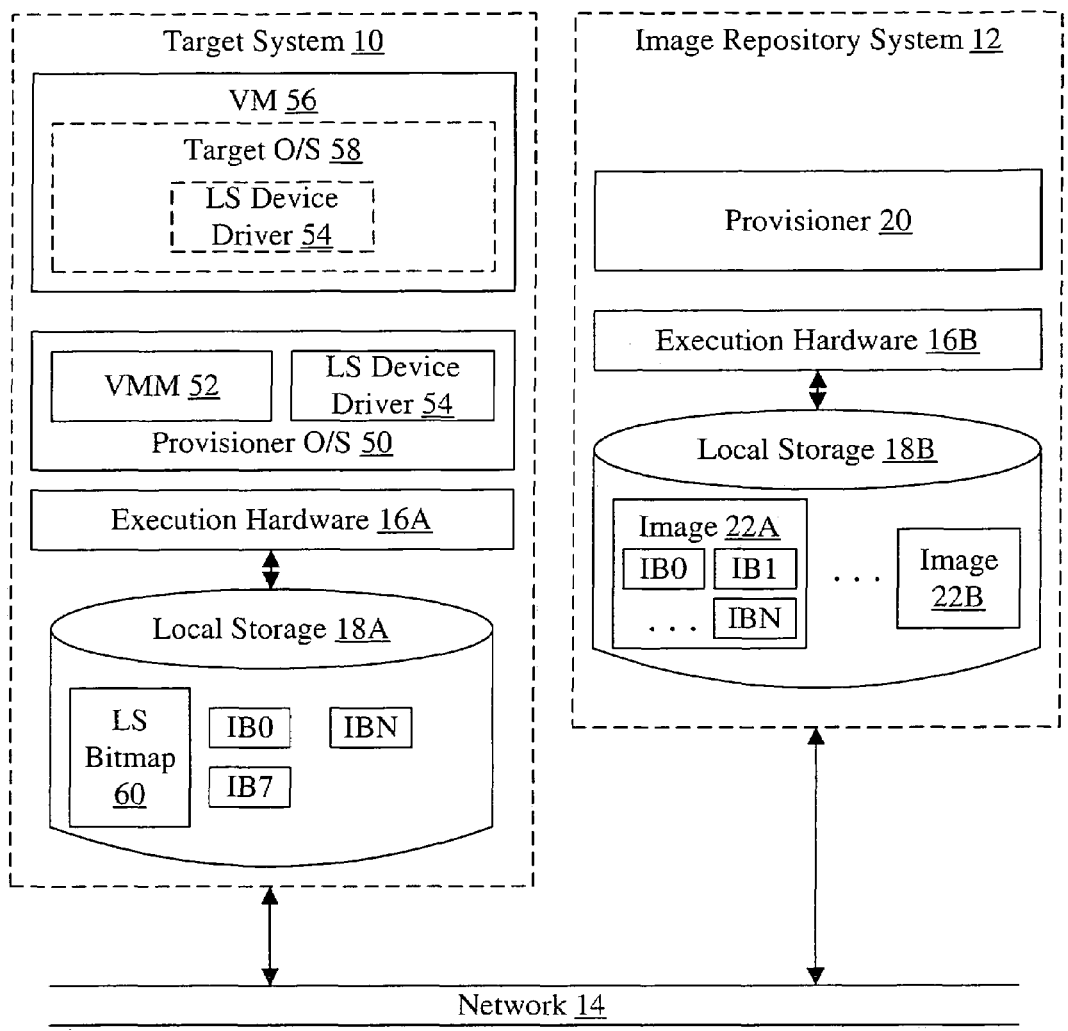
FIG. 3 is a block diagram of one embodiment of the target system and the image repository at a first point in time during the provisioning.

Turning now to FIG. 3, a block diagram is shown illustrating one embodiment of the target system 10 and the image repository system 12 at a point in time in the operation of the flowchart of FIG. 2 after the virtual machine has been established on the target system 10 but before the LS device driver has been initialized in the target operating system. The target system 10 has the provisioner O/S 50 described above, including the VMM 52 and the LS device driver 54, executing on the execution hardware 16A (and memory resident, in one embodiment). Additionally, the virtual machine 56 is active, executing the target operating system 58; which includes the LS device driver 54. The target O/S 58 and the LS device driver 54A within the target O/S 58 are shown in dotted form, since the blocks storing this code may not yet have been fetched from the image repository system 12 and stored in the local storage 18A.

Shown in the local storage 18A are several blocks from the image 22A (which, in this example, may be the image corresponding to the target O/S 58 and any other desired software resources, not shown). For example, EB0, IBN, and IB7 may be stored in the local storage 18A. As mentioned above, the LS device driver 54 may track which blocks are stored in the local storage 18A. For example, in the illustrated embodiment, the LS device driver 54 may maintain an LS bitmap 60 which identifies which blocks are stored in the local storage 18A. When the LS device driver 54 fetches one or more blocks from the image repository system 12 and stores the blocks in the local storage 18A, the LS device driver 54 may update the LS bitmap 60 to indicate that the fetched blocks are in the local storage 18A.

In one embodiment, the LS bitmap 60 may include an entry for each block in the local storage 18A. The entry may include a bit (referred to as the read bit with regard to FIG. 10) indicating whether or not the block is present in the local storage 18A. For example, the bit may be set to indicate that the block is present and clear to indicate that the block is not present. Alternatively, the opposite meanings of the set and clear states of the bit may be used, or other encodings may be used. Additionally, each entry may include one or more bits for indicating whether or not the corresponding block has been written (e.g. the W0 to WN bits in FIG. 10), as described in more detail below.

Figure 4:
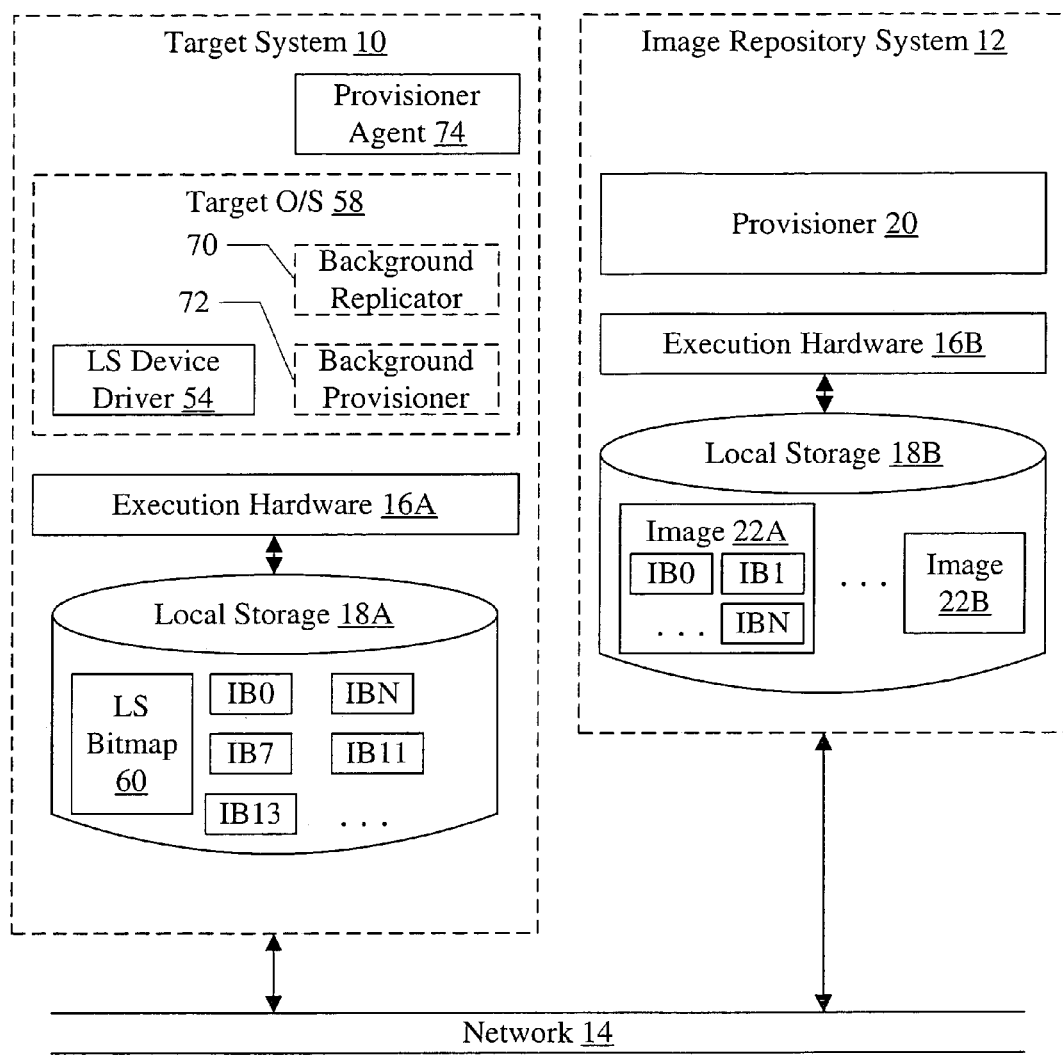
FIG. 4 is a block diagram of one embodiment of the target system and the image repository at a second point in time during the provisioning.

FIG. 4 is a block diagram illustrating one embodiment of the target system 10 and the image repository system 12 at a point in time in the operation of the flowchart of FIG. 2 after the virtual machine has exited. The target O/S 58 is shown, no longer executing with a virtual machine but instead executing directly on the execution hardware 16A as a "real" machine. The target O/S 58 is shown in dotted form to indicate that portions of the target O/S 58 may not yet be resident on the local storage 18A. The LS device driver 54 may, however, be fully resident on the local storage 18A at this point. The target O/S 58 may optionally include a background replicator 70 and/or a background provisioner 72. Executing on the target O/S 58 may be a provisioner agent 74. Additional blocks from the image 22A may be resident on the local storage 18A, having been stored therein by the LS device driver 54.

The background provisioner 72 may be a background process (a process that executes when other portions of the target O/S 58 and applications executing thereon are idle) that may fetch blocks from the image repository system 12 and store them in the local storage 18A, without any corresponding request from the target O/S 58 or applications. The background provisioner 72 may also update the LS bitmap 60 to indicate that the blocks are present in the local storage 18A. The background provisioner 72 may be used to complete the fetching of the blocks in the image 22A, so that the target system 10 may not be dependent on the availability of the network 14 for fetching blocks at a later time. In other embodiments, the image repository system 12 may push blocks to the target system 10, and the background provisioner 72 may receive the blocks and store them in the local storage 18A. Additional details of one embodiment of the background provisioner 72 are provided below with regard to FIG. 6.

The background replicator 70 may be a background process that may replicate modified blocks to the image repository system 12. In this manner, when a snapshot is desired, some of the modified blocks may already have been provided by the target system 10 to the image repository system 12. Additional details of one embodiment of the background replicator 70 are provided below with regard to FIG. 9.

The provisioner agent 74 may comprise software that is designed to communicate with the provisioner software 20. Particularly, the provisioner agent 74 may be used in one embodiment of snapshotting the target system 10, described in more detail below.

It is noted that, while a bitmap 60 is shown in FIGS. 3 and 4 as the mechanism for recording which blocks are present in the local storage 18A and/or which blocks have been written by the target system 10, other embodiments may record such blocks in any fashion. For example, one or more lists may be maintained of which blocks are present and which have been written to. In other embodiments, each block may include an indication of whether or not it is present and whether or not it has been written to. As used herein, a "map" may comprise any data structure capable of tracking which blocks are present and which have been written. Generally, the LS device driver 54 may employ any mechanism for recording or tracking which image blocks are present in the local storage and/or modified with respect to the image on the image repository system.

Figure 5:
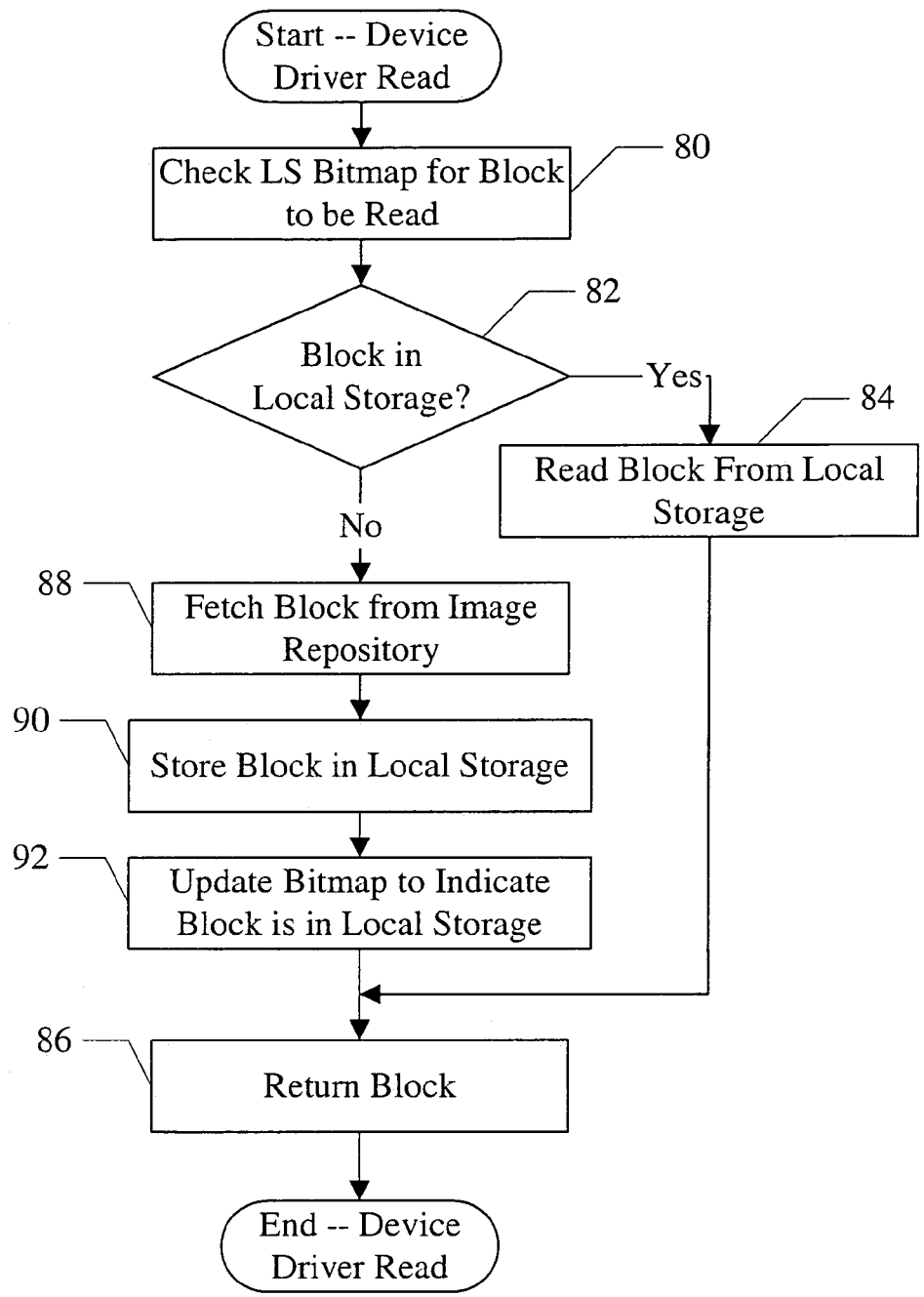
FIG. 5 is a flowchart illustrating operation of one embodiment of a device driver for the local storage of the target system in response to a block read request.

FIG. 5 is a flowchart illustrating operation of one embodiment of the LS device driver 54 in response to a read request generated by the target O/S 58, or applications executing thereon. That is, the LS device driver 54 may include instructions which, when executed, implement the function of the flowchart shown in FIG. 5.

The LS device driver 54 may check the LS bitmap 60 for the requested block (reference numeral 80). If the LS bitmap 60 indicates that the block is present in the local storage 18A (decision block 82—"yes" leg), the LS device driver 54 may read the block from local storage (reference numeral 84) and return the block to the requestor (reference numeral 86). On the other hand, If the LS bitmap 60 indicates that the block is not in the local storage 18A (decision block 82—"no" leg), the LS device driver 54 may fetch the block from the image repository system 12 (reference numeral 88), store the block in the local storage 18A (reference numeral 90), update the LS bitmap 60 to indicate that the block is stored in the local storage 18A (reference numeral 92), and return the block to the requestor (reference numeral 86). As mentioned above, the block may be fetched from one of one or more repositories, each of which may store the image or a portion of the image, in various embodiments.

In one embodiment, the image repository system 12 may make the various images 22A-22B mountable under NFS, CIFS, or another network filesystem. The target system 10 may mount the image 22A, and fetching the blocks from the image repository system 12 may occur through the network filesystem mechanism. Other embodiments may use any communication mechanism to transfer blocks between the image repository system 12 and the target system 10. For example, transfer over a network, transfer between devices in a SAN, transfers between iSCSI devices, or any combination of the above may be used.

While the description above refers to a read request for a block, a read request may be for multiple blocks, in some embodiments. In such embodiments, the device driver 54 may fetch any blocks that are not in the local storage 18A from the image repository system 12 and store them in the local storage 18A, and may read the requested blocks from the local storage 18A for return to the requestor.

Figure 6:
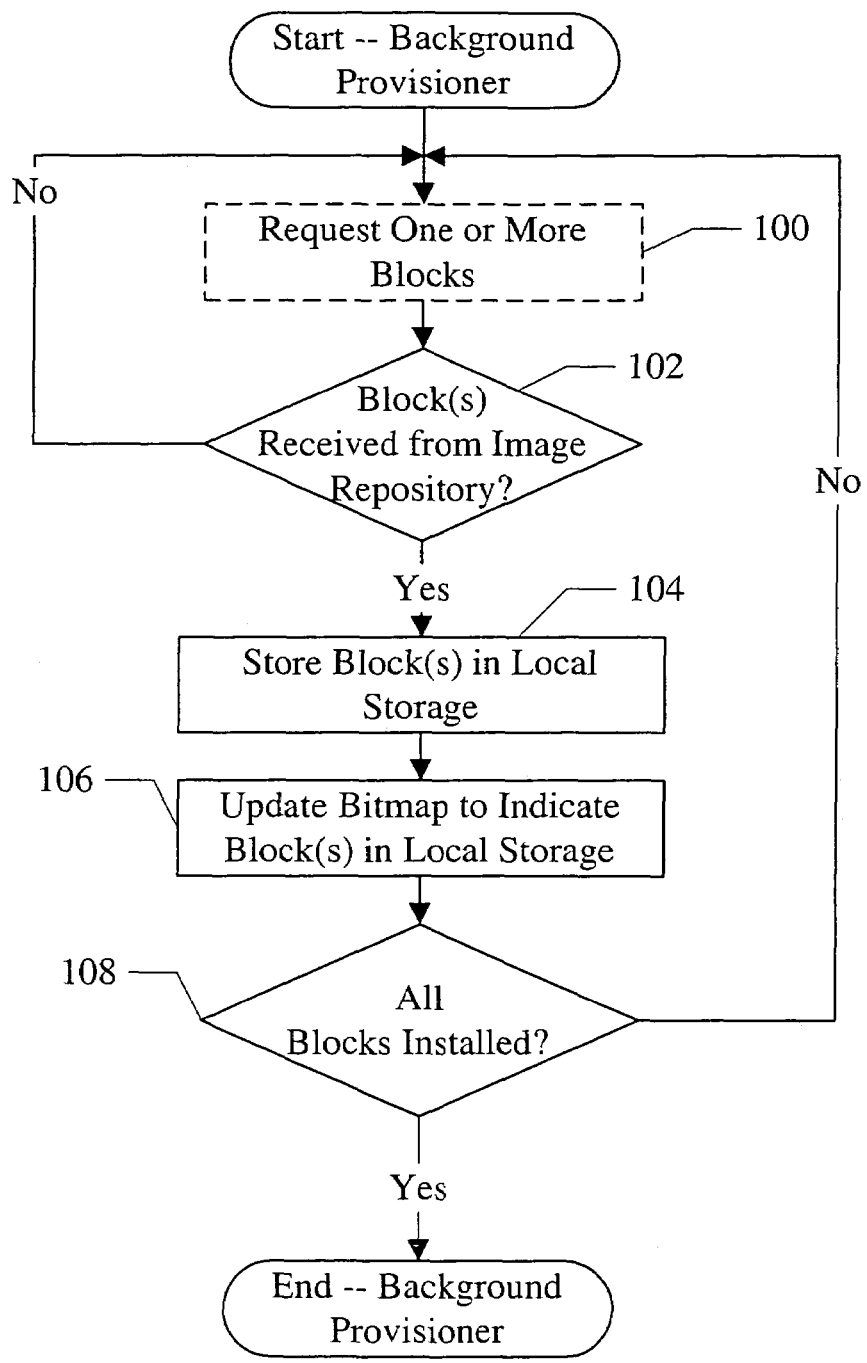
FIG. 6 is a flowchart illustrating operation of one embodiment of a background provisioner shown in FIG. 4.

FIG. 6 is a flowchart illustrating operation of one embodiment of the background provisioner 72. That is, the background provisioner 72 may include instructions which, when executed, implement the function of the flowchart shown in FIG. 6.

Optionally, the background provisioner 72 request one or more blocks from the image repository system 12 (reference numeral 100). The background provisioner 72 may consult the LS bitmap 60 to determine which blocks to request (i.e. blocks that are not already stored in the local storage 18A). In other embodiments, the image repository system 12 may transmit the blocks to be stored, rather than the background provisioner 72 requesting them. Generally, the background provisioner 72 may request or receive blocks from the image repository system 12 independent of requests received by the device driver 54.

If the background provisioner 72 receives a block or blocks from the image repository system 12 (decision block 102—"yes" leg), the background provisioner 72 may store the received blocks in the local storage 18A (reference numeral 104). In some embodiments, the background provisioner 72 may check the LS bitmap 60 to ensure that the LS device driver 54 has not written the block (in response to a write request from the target O/S 58 or applications executing thereon), to avoid overwriting the block in the local storage 18A. The background provisioner 72 may also update the bitmap to indicate that the received blocks are now present in the local storage 18A (reference numeral 106).

The background provisioner 72 may determine if all the blocks from the image 22A have been installed in the local storage 18A (decision block 108). If not (decision block 108—"no" leg), the background provisioner 72 may continue requesting and receiving blocks from the image repository system 12. If all blocks from the image repository system 12 have been installed (decision block 108—"yes" leg), the background provisioner 72 may exit. In some embodiments, the background provisioner 72 may communicate to the LS device driver 54 that all blocks have been stored in the local storage 18A. The LS device driver 54 may record an indication that all blocks are present, and may cease checking the LS bitmap 60 for read requests.

Figure 7:
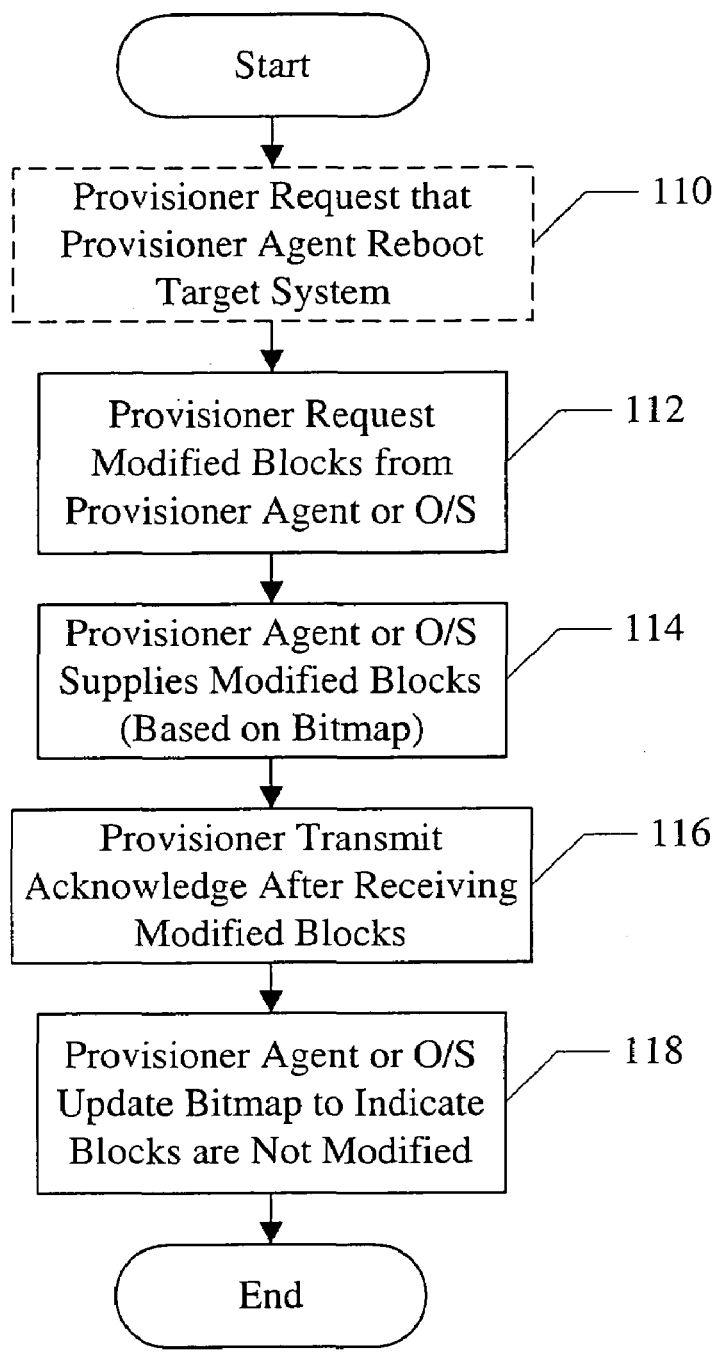
FIG. 7 is a flowchart illustrating one embodiment of a method for snapshotting a provisioned target system.

Turning now to FIG. 7, a flowchart is shown illustrating one embodiment of a method of snapshotting a provisioned target system (e.g. the target system 10 in FIG. 1). One or more blocks shown in FIG. 7 may be implemented in various software, as described. That is, the software may comprise instructions which, when executed, implement the functions described for the corresponding blocks.

Optionally, the provisioner software 20 may request that the provisioner agent 74 cause a reboot of the target system 10 (reference numeral 110). Such a request may be made, for example, if a fully consistent snapshot is desired. Some software may update blocks on the local storage 18A, but may not commit the updates until a later time (e.g. journaled filesystems, transaction-based systems such as databases, etc.). In effect, the order of updates to the blocks may be important to the consistency of the image. However, order may not be determined from the LS bitmap 60. Block 110 may be eliminated if a fully consistent snapshot is not desired, or if the software executing on the target system 10 does not execute in such a way that inconsistencies are possible.

The provisioner software 20 may request the modified blocks from the provisioner agent 74 (or, alternatively, directly from the target O/S 58) (reference numeral 112). Using the modified indications in the LS bitmap 60 for each block, the provisioner agent 74 or the target O/S 58 may determine which blocks have been modified, and may transmit the blocks to the provisioner software 20 (reference numeral 114). The provisioner software 20, after successfully receiving the modified blocks, may transmit an acknowledge to the provisioner agent 74 or the target O/S 58 (reference numeral 116). In response to the acknowledge, the provisioner agent 74 may update the bitmap to indicate that the blocks are not modified (reference numeral 118).

In some embodiments, the LS bitmap 60 may include multiple indications for each block to indicate that the block has been updated. Such embodiments may be used if replication/snapshotting to multiple computer systems is desired. When a given computer system requests modified blocks, the corresponding indications for each block may be used to determine if the block is modified and the corresponding indications may be updated to indicate not modified.

It is noted that the same image (e.g. image 22A) may be used to provision multiple separate systems concurrently, provided that snapshotting of each system is maintained in a fashion that the snapshots may be uniquely determined (e.g. using a copy on write approach).

Figure 8:
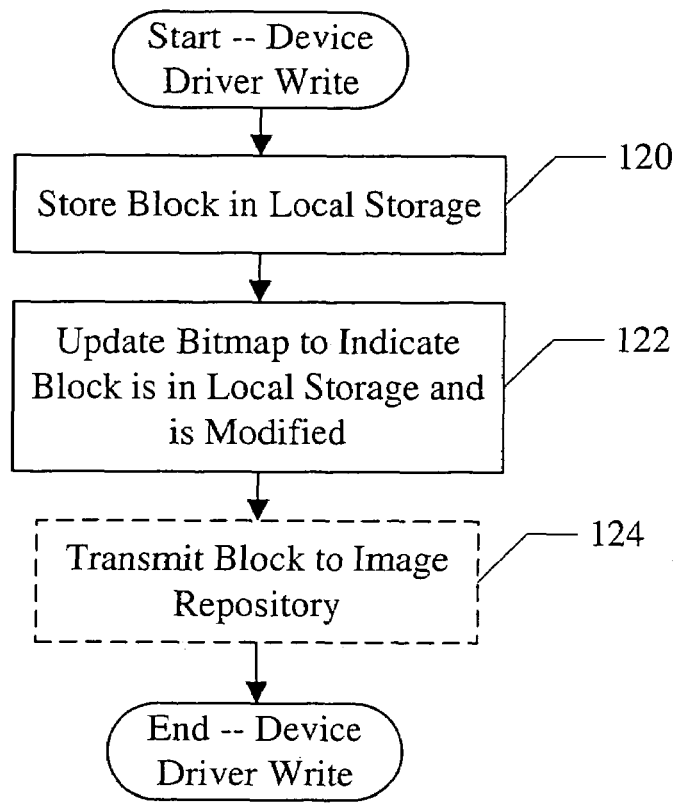
FIG. 8 is a flowchart illustrating operation of one embodiment of the device driver for the local storage of the target system in response to a block write request.

FIG. 8 is a flowchart illustrating operation of one embodiment of the LS device driver 54 in response to a write request generated by the target O/S 58, or applications executing thereon. That is, the LS device driver 54 may include instructions which, when executed, implement the function of the flowchart shown in FIG. 8.

The LS device driver 54 may store the block supplied by the requestor in the local storage 18A (reference numeral 120). The LS device driver 54 may update the LS bitmap 60 to indicate that the block is present (in case it was not present previously) and modified (reference numeral 122). Optionally the LS device driver 54 may transmit the block to the image repository 12 for storage (reference numeral 124). If the block is transmitted, the LS device driver 54 may update the LS bitmap 60 to indicate not modified responsive to receiving an acknowledge from the image repository system 12. The LS device driver 54 may transmit the block synchronously or asynchronously. In yet another option, automatic replication software (such as Veritas Volume Replicator or Veritas Storage Replicator products available from VERITAS Software Corporation) may be used to replicate the modified blocks to the image repository system 12. In yet other alternatives, the background replicator 70 may be used.

While the description above refers to a write request for a block, a write request may be for multiple blocks, in some embodiments. In such embodiments, the device driver 54 may store each block in the local storage 18A and update the LS bitmap 60 accordingly (and optionally transmit the block to the image repository system 12).

Figure 9:
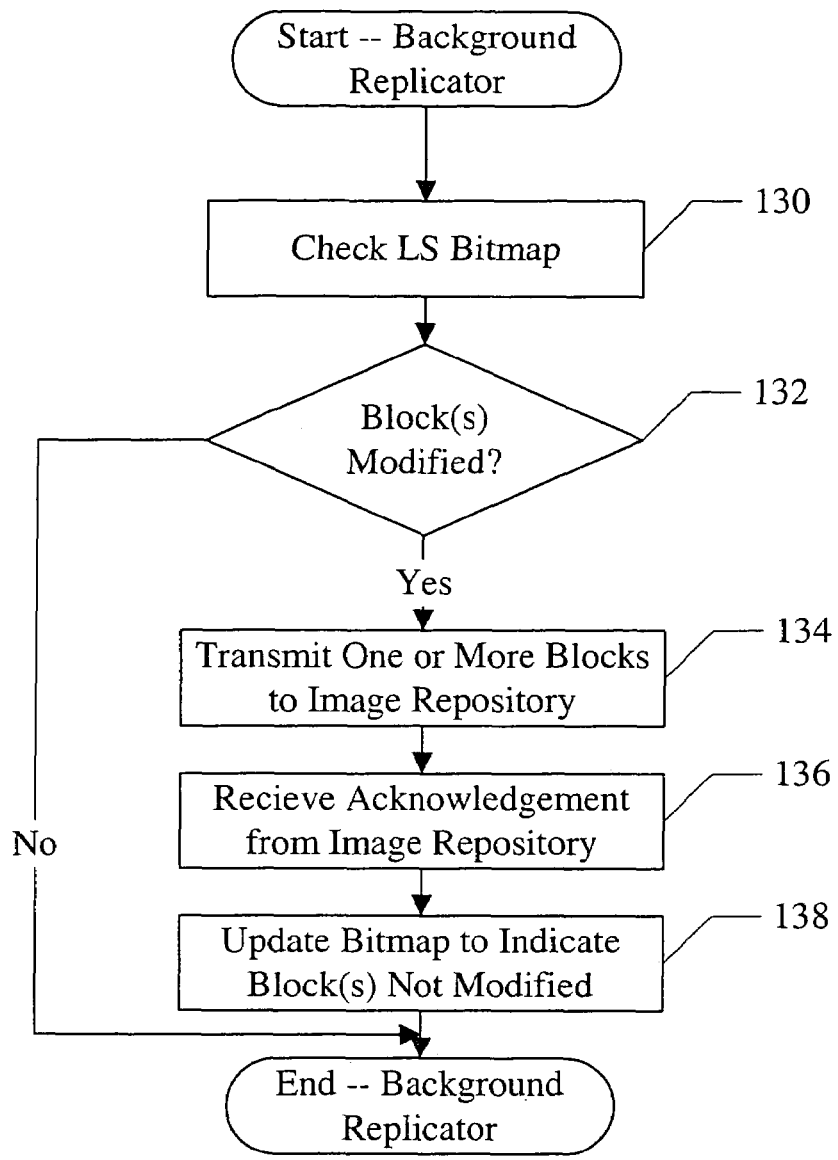
FIG. 9 is a flowchart illustrating operation of one embodiment of a background replicator shown in FIG. 4.

Turning now to FIG. 9, a flowchart is shown illustrating operation of one embodiment of the background replicator 70. That is, the background replicator 70 may include instructions which, when executed, implement the function of the flowchart shown in FIG. 9.

The background replicator 70 may check the LS bitmap 60 to determine if there are any modified blocks in the local storage 18A (reference numeral 130). If there are no modified blocks (decision block 132—"no" leg), the background replicator 70 may be idle. If there are modified blocks (decision block 132—"yes" leg), the background replicator 70 may transmit one or more modified blocks to the image repository system 12 (reference numeral 134). The background replicator 70 may receive the acknowledgement from the image repository system 12 (reference numeral 136), and may update the LS bitmap 60 to indicate that the transmitted blocks are not modified responsive to the acknowledgement (reference numeral 138). As mentioned above, replication may be performed to more than one repository, in some embodiments.

As mentioned above, if the target system 10 is not rebooted prior to copying modified blocks, it may be difficult to generate a consistent snapshot. In some embodiments, the volume manager or filesystem executing on the target system 10 may be modified to insert calls to the LS device driver 54 when a transaction is being completed (e.g. after the filesystem metadata updates, such as directory updates, have been completed). The calls from the volume manager or filesystem may be used to mark when a consistent state may be available, which may be used to determine when a consistent snapshot may be created.

It is noted that, in some embodiments, the provisioner software 20 may be configured to speculatively include one or more additional blocks in response to a fetch of blocks by the LS device driver 54. In this manner, copying of blocks to the target system 10 may be accelerated. In some embodiments, the provisioner software 20 may be configured to track the pattern of requests from the LS device driver 54 to predict the next most likely blocks to be fetched, and the predicted blocks may be included in response to the fetch (along with the requested blocks).

Figure 10:
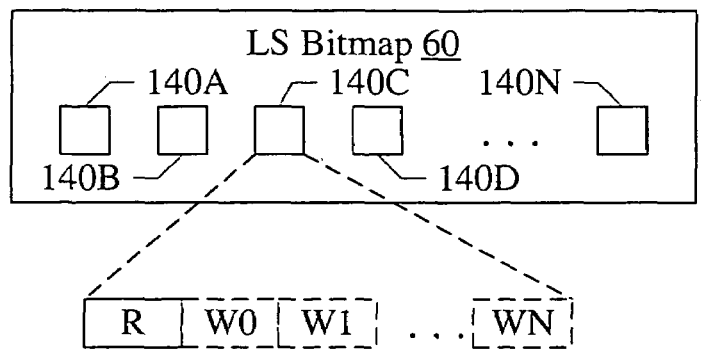
FIG. 10 is a block diagram of one embodiment of a local storage bitmap shown in FIGS. 3 and 4.

Turning now to FIG. 10, a block diagram illustrating one embodiment of the LS bitmap 60 is shown. The LS bitmap 60 may include an entry for each block in the local storage 18A (e.g. entries 140A-140N in FIG. 10). Entry 140C is shown in exploded view, and includes a read bit (R) and may optionally include one or more write bits (W0, W1, etc. through WN). The read bit may indicate whether or not the block is present in the local storage 18A (as described previously). One of the write bits may indicate whether or not the block is modified with respect to the corresponding block in the image on the image repository system 12. For example, if the write bit is set, the block may be modified with respect to the corresponding block in the image and if the write bit is clear, the block may not be modified with respect to the corresponding block in the image. Alternative embodiments may use the opposite definition of the set and clear states, or another encoding. Multiple write bits may be included, in some embodiments, to track whether a given block is modified with respect to multiple image repository systems (or other computer systems that may be used to make replicated copies of the images).

It is noted that, while the above embodiment includes an LS device driver that tracks both which blocks are present (to permit provisioning without copying all the blocks of the image) and which blocks have been written (to permit snapshotting as described herein), other embodiments may implement only tracking which blocks are present (and the corresponding provisioning features) or only which blocks have been written (and the corresponding snapshotting features), as desired.

Figure 11:
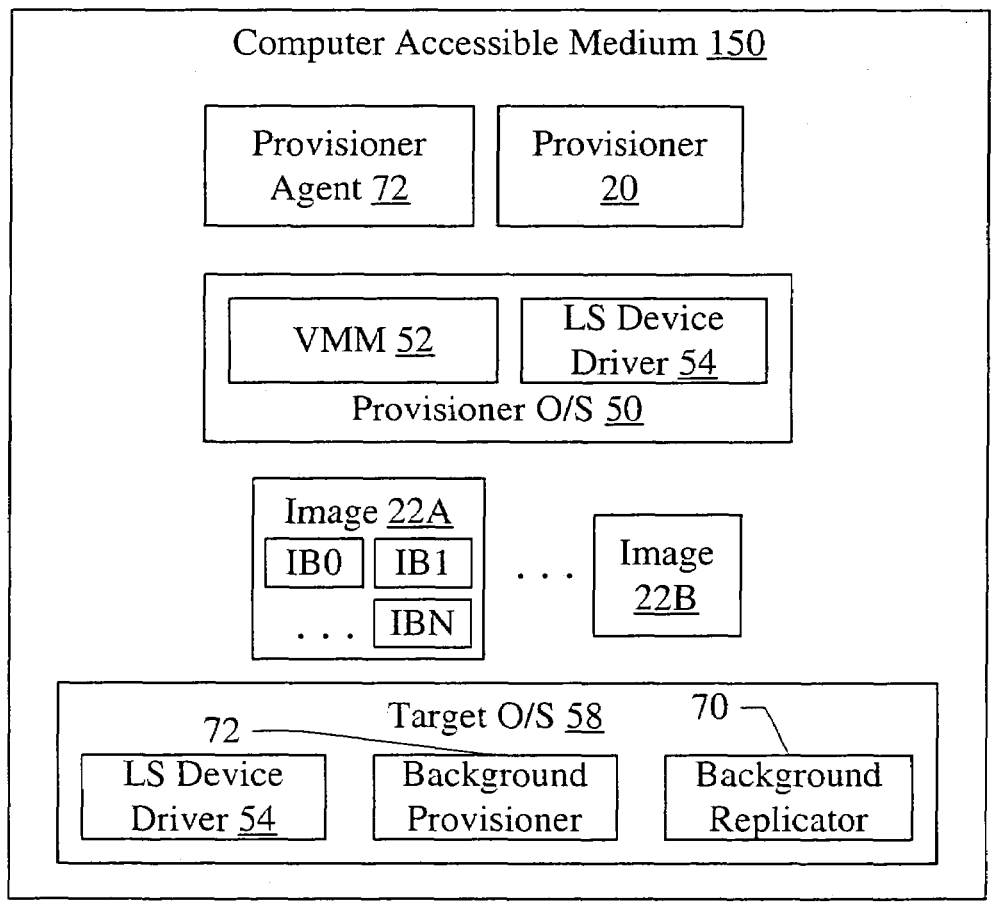
FIG. 11 is a block diagram of one embodiment of a computer accessible medium.

Turning now to FIG. 11, a block diagram of a computer accessible medium 150 is shown. Generally speaking, a computer accessible medium may include any media accessible by a computer during use to provide instructions and/or data to the computer. For example, a computer accessible medium may include storage media such as magnetic or optical media, e.g., disk (fixed or removable), CD-ROM, or DVD-ROM, CD-R, CD-RW, DVD-R, DVD-RW, volatile or non-volatile memory media such as RAM (e.g. synchronous dynamic RAM (SDRAM), Rambus DRAM (RDRAM), static RAM (SRAM), etc.), ROM, etc., as well as media accessible via transmission media or signals such as electrical, electromagnetic, or digital signals, conveyed via a communication medium such as a network and/or a wireless link. The computer accessible medium 150 in FIG. 11 may be encoded with one or more of the provisioner agent 74, the provisioner software 20, the VMM 52, the LS device driver 54, the provisioner O/S 50, the images 22A-22B, the target O/S 58, the background provisioner 72, and/or the background replicator 70. Each of the provisioner agent 74, the provisioner software 20, the VMM 52, the LS device driver 54, the provisioner O/S 50, the target O/S 58, the background provisioner 72, and the background replicator 70 may comprise instructions which, when executed, implement the functionality described herein for the software. Generally, the computer accessible medium 150 may store any set of instructions which, when executed, implement a portion or all of the flowcharts shown in one or more of FIGS. 2 and 5-9.

It is noted that, while the provisioner agent 74, the provisioner software 20, the VMM 52, the LS device driver 54, the provisioner O/S 50, the target O/S 58, the background provisioner 72, and the background replicator 70 have been described as software executing on various systems, one or more of the above may be implemented partially in software and partially in hardware in the respective systems, or wholly in hardware in the respective systems, in various embodiments.

Numerous variations and modifications will become apparent to those skilled in the art once the above disclosure is fully appreciated. It is intended that the following claims be interpreted to embrace all such variations and modifications.

What is claimed is:

1. A computer accessible storage medium comprising instructions which, when executed:
   establish a virtual machine on a computer system;
   trap reads by the virtual machine to an image of a set of software resources to be provisioned on the computer system; and
   for each read:
   (a) check a first storage from which the computer system is configured to boot for a block identified in the read, wherein the block is included within the image of the set of software resources;

(b) if the block is stored in the first storage, supply the block from the first storage in response to the read; and
(c) if the block is not stored in the first storage:
  fetch at least the block from an image repository system that stores the image;
  store the block in the first storage; and
  supply the block in response to the read; and
wherein the instructions, when executed:
  detect an initialization of a device driver for the first storage within the virtual machine, the device driver coded to perform (a), (b), and (c) in response to read requests to the first storage; and
  exit the virtual machine in response to detecting the initialization.

2. The computer accessible storage medium as recited in claim 1 wherein the instructions, when executed:
  trap writes by the virtual machine to the image; and
  for each write, store the block or blocks in the first storage and track the blocks as modified with respect to the image on the image repository system.

3. The computer accessible storage medium as recited in claim 1 further comprising second instructions which, when executed in response to a remote boot request from the computer system, transmit a program comprising the instructions to the computer system, the computer system booting using the program.

4. A computer accessible storage medium comprising instructions which, when executed:
  (a) check a first storage from which a computer system is configured to boot for a block identified in a read request generated on the computer system, wherein the first storage is non-volatile, and wherein the block is included within an image of a set of software resources to be provisioned on the computer system;
  (b) if the block is stored in the first storage supply the block from the first storage in response to the read request; and
  (c) if the block is not stored in the first storage:
    fetch at least the block from an image repository system that stores the image;
    store the block in the first storage; and
    supply the block in response to the read request; and
wherein the instructions, when executed, maintain a map identifying which blocks of the image are stored in the first storage, and wherein checking the first storage for the block comprises checking the map, and wherein the instructions comprise a device driver, and wherein the computer accessible storage medium further comprises a program comprising second instructions which when executed:
  receive one or more additional blocks from the image repository system, wherein the one or more additional blocks are received independent of read requests generated in the computer system and received by the device driver;
  store the one or more additional blocks in the first storage; and
  update the map to indicate that the one or more additional blocks are stored in the first storage.

5. The computer accessible storage medium as recited in claim 4 wherein the instructions, when executed, update the map to indicate that the block is stored in the first storage in response to fetching the block from the image repository system and storing the block in the first storage.

6. The computer accessible storage medium as recited in claim 5 wherein the instructions, when executed in response to a write request, store a second block supplied in the write request in the first storage and update the map to indicate that the second block is stored in the first storage and is modified with respect to the image in the image repository system.

7. The computer accessible storage medium as recited in claim 4 wherein the second instructions, when executed, request the one or more additional blocks from the image repository system independent of read requests generated in the computer system and received by the device driver.

8. The computer accessible storage medium as recited in claim 7 wherein the second instructions terminate execution in response to detecting that each block within the image is stored in the first storage.

9. The computer accessible storage medium as recited in claim 4 wherein the first storage comprises a local storage of the computer system.

10. The computer accessible storage medium comprising instructions which, when executed:
  (a) check a first storage from which a computer system is configured to boot for a block identified in a read request generated on the computer system, wherein the block is included within an image of a set of software resources to be provisioned on the computer system;
  (b) if the block is stored in the first storage, supply the block from the first storage in response to the read request;
  (c) if the block is not stored in the first storage:
    fetch at least the block from an image repository system that stores the image;
    store the block in the first storage; and
    supply the block in response to the read request;
  maintain a map identifying which blocks of the image are stored in the first storage, and wherein checking the first storage for the block comprises checking the map;
  update the map to indicate that the block is stored in the first storage in response to fetching the block from the image repository system and storing the block in the first storage;
  in response to a write request, store a second block supplied in the write request in the first storage and update the map to indicate that the second block is stored in the first storage and is modified with respect to the image in the image repository system;
  receive a request from the image repository system for modified blocks within the image;
  identify modified blocks within the map; and
  transmit the modified blocks to the image repository system.

11. The computer accessible storage medium as recited in claim 10 wherein the instructions, when executed:
  receive an acknowledgement from the image repository system corresponding to the modified blocks; and
  update the map to indicate that the modified blocks are not modified with respect to the image repository system.

12. The computer accessible storage medium as recited in claim 11 wherein the instructions, when executed, track blocks in the map as modified or not modified separately for two or more computer systems including the image repository system.

13. The computer accessible storage medium comprising instructions which, when executed:
  store a block identified in a write request generated within a computer system to a first storage from which the computer system is configured to boot, the block included in an image of a set of software resources that are provisioned on the computer system, wherein the first storage is non-volatile;

record that the block is modified with respect to the image stored in an image repository system;
transmit the block to the image repository system;
receive an acknowledgement from the image repository system corresponding to the block; and
record that the block is not updated with respect to the image stored in the image repository system responsive to the acknowledgement.

14. The computer accessible medium as recited in claim 13 where the instruction that record that the block is modified, when executed, update a map identifying blocks within the image that are stored in the first storage to indicate that the block is stored in the first storage and is modified with respect to the image stored in an image repository system.

15. The computer accessible storage medium as recited in claim 13 wherein the instructions, when executed, transmit a plurality of blocks recorded as modified, the plurality of blocks including the block.

16. The computer accessible storage medium as recited in claim 15 wherein the instructions, when executed, transmit the plurality of blocks in response to receiving the request from the image repository system.

17. The computer accessible storage medium as recited in claim 13 wherein the first storage comprises a local storage of the computer system.

18. A method for provisioning a computer system with a set of software resources, the method comprising:
initiating execution of the set of software resources on the computer system prior to storing at least some blocks comprising the set of software resources to a first storage from which the computer system is configured to boot, wherein the first storage is non-volatile;
the computer system generating a read request for a first block of the blocks comprising the set of software resources;
if the first block is stored in the first storage, supplying the first block from the first storage; and
if the first block is not stored in the first storage:
fetching the first block from an image repository system that stores an image of the set of software resources;
storing the first block in the first storage; and
supplying the first block in response to the read request;
establishing a virtual machine on the computer system, the virtual machine initiating the execution of the set of software resources the virtual machine generating the read request;
trapping the read request by the virtual machine to the first storage;
detecting that a device driver for the first storage within the set of software resources has been initialized; and
terminating the virtual machine responsive to the detecting.

19. The method as recited in claim 18 wherein initiating execution of the set of software resources comprises responding to a remote boot request from the computer system with a plurality of instructions which, when executed, initiate the execution.

20. The method as recited in claim 18 further comprising:
trapping a write request by the virtual machine to the image; and
storing a block or blocks from the write request in the first storage and tracking the block or blocks as modified with respect to the image on the image repository system.

21. An apparatus comprising:
an image repository system configured to store an image of a set of software resources; and
a computer system, wherein the computer system is configured to transmit a remote boot request in response to booting;
wherein the image repository system is coupled to receive the remote boot request, and wherein the image repository system is configured to detect that the computer system is to be provisioned with the set of software resources, and wherein the image repository system is configured to respond to the remote boot request with a program which, when executed by the computer system, initiates execution of the set of software resources prior to at least some blocks in the image being copied to the computer system, and wherein the computer system includes a first storage that is to store the image, and wherein the set of software resources includes a device driver for the first storage which, when executed in response to a read request generated responsive to executing the set of software resources, is configured to check the first storage for a first block identified by the read request, and wherein the device driver is configured to supply the first block from the first storage if the first block is stored in the first storage.

22. The apparatus as recited in claim 21 wherein the device driver is configured to fetch the first block from the image repository system if the first block is not stored in the first storage, and wherein the device driver is configured to store the first block in the first storage, and wherein the device driver is configured to supply the first block in response to the read request.

23. The apparatus as recited in claim 21 wherein the program is configured to establish a virtual machine to execute the set of software resources until the device driver is initialized, and wherein the virtual machine is terminated responsive to the device driver being initialized.

24. The apparatus as recited in claim 21 wherein the device driver, in response to a write request generate responsive to executing the set of software resources, is configured to store a second block identified by the write request in the first storage, and wherein the device driver is configured to track which blocks in the first storage are modified with respect to the image on the image repository system.

25. The apparatus as recited in claim 24 wherein the image repository system is configured to generate a snapshot image of the set of software resources by requesting the modified blocks from the computer system, and wherein the computer system is configure to transmit the modified blocks to the image repository system in response to the request, and wherein the image repository system is configured to transmit an acknowledgement responsive to receiving the modified blocks, and wherein the computer system is configured to indicate that the blocks are not modified with respect to the image on the image repository system responsive to the acknowledgement.

26. An apparatus comprising:
an image repository computer system configured to store an image of a set of software resources; and
a computer system coupled to communicate with the image repository computer system, wherein the computer system is configured to execute the set of software resources, and wherein the computer system is configured to track which blocks in a first storage from which the computer system is configured to boot and which correspond to the image are updated with respect to the image stored on the image repository computer system, the updates generated by the computer system during execution of the set of software resources; and wherein a snapshot of the image as updated by the computer system is generated by transmitting the modified blocks from the computer system to the image repository computer system and not transmitting unmodified blocks.

27. The apparatus as recited in claim 26 wherein the image repository computer system is configured to transmit an acknowledgement to the computer system in response to receiving the modified blocks.

28. The apparatus as recited in claim 27 wherein the computer system is configured to indicate that the modified blocks are not modified responsive to the acknowledgement.

29. The apparatus as recited in claim 26 wherein the first storage comprises a local storage of the computer system.

* * * * *